(12) United States Patent
Lou

(10) Patent No.: US 7,642,675 B2
(45) Date of Patent: Jan. 5, 2010

(54) MULTI-PURPOSE SWITCH ACTIVATED SYSTEM AND METHOD FOR USING SAME

(75) Inventor: Wenkwei Lou, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 18 days.

(21) Appl. No.: 11/983,684

(22) Filed: Nov. 9, 2007

(65) Prior Publication Data

US 2009/0121554 A1 May 14, 2009

(51) Int. Cl.
*H01H 47/00* (2006.01)
(52) U.S. Cl. ...................................... 307/125
(58) Field of Classification Search .................. 307/125
See application file for complete search history.

(56) References Cited

U.S. PATENT DOCUMENTS 4,672,233 A * 6/1987 Scott ........................... 307/141
7,400,900 B2 * 7/2008 Chiu et al. ................... 455/522
2008/0184052 A1 * 7/2008 Itoh et al. ..................... 713/324

* cited by examiner

*Primary Examiner*—Robert L. Deberadinis
(74) *Attorney, Agent, or Firm*—Farjami & Farjami LLP

(57) ABSTRACT

According to one embodiment, a system with a multi-purpose switch for providing a power on function and other functions to a user comprises a temporary power control circuit configured to be coupled to and decoupled from a power source by the multi-purpose switch. The system also comprises a continuous power control circuit to provide continuous power. As a result, the multi-purpose switch is capable of providing other functions when the continuous power is being provided. In one embodiment, a method for utilizing a multi-purpose switch to provide a power on function and other functions to a user comprises coupling a temporary power control circuit to a power source by the multi-purpose switch, triggering a continuous power control circuit to provide continuous power, decoupling the temporary power control circuit from the power source by the multi-purpose switch, and making the multi-purpose switch available to provide other functions.

20 Claims, 4 Drawing Sheets

MULTI-PURPOSE SWITCH ACTIVATED SYSTEM AND METHOD FOR USING SAME

BACKGROUND OF THE INVENTION

1. Field of the Invention

The present invention is generally in the field of electronics. More specifically, the present invention is in the field of electronic circuits and systems.

2. Background Art

Advances in fabrication technology are enabling production of electronic systems that are ever more portable and of progressively diminished size. As their portability has increased, these systems have come increasingly to rely on modular power sources, such as batteries, to provide them with operating power. Moreover, as system size has diminished, the batteries relied upon for power have become smaller as well. Despite advances in energy storage efficiency, the reduction in battery size mandated by smaller electronic system architectures has resulted in reduction of the total stored energy available to power those systems. An undesirable consequence of these otherwise advantageous improvements in dimensional reduction is that electronic systems utilizing integrated circuits produced by means of sub-micron and deep sub-micron fabrication technologies are now challenged by limited battery life due in part to current leakage within those systems.

An additional challenge posed by reduced device and system size results from the effect of dimensional restriction on user controls. Inevitably, as the size of a system or device is reduced, the area available to accommodate user input controls is reduced as well. Consequently, the user of a modern diminutive electronic system may be severely limited in the number and variety of system commands under his or her control, due to a limitation on the number of separate input controls that can be supported by the system architecture.

One conventional approach to improving battery life in a battery operated electronic system addresses leakage in the circuit enabling power to the system. For example, more than one power mode may be made available to limit sources of leakage from inactive circuits within the system. By way of a specific example, an electronic system comprising a Bluetooth headset may be configured to have three such power modes, off, standby, and fully activated, where the standby mode preserves battery life while maintaining system responsiveness to communication signals. This conventional approach, although offering some advantages with respect to preserving battery life, fails to resolve, or even address, disadvantages associated with the limited number of user input controls on those and smaller electronic systems.

Thus, there is a need in the art for a solution enhancing the efficiency of an electronic system by increasing the functionality of a user input control, while enabling power conservation.

SUMMARY OF THE INVENTION

A multi-purpose switch activated system and method for using same, substantially as shown in and/or described in connection with at least one of the figures, and as set forth more completely in the claims.

DETAILED DESCRIPTION OF THE INVENTION

The present invention is directed to a multi-purpose switch activated system and method for using same. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1:
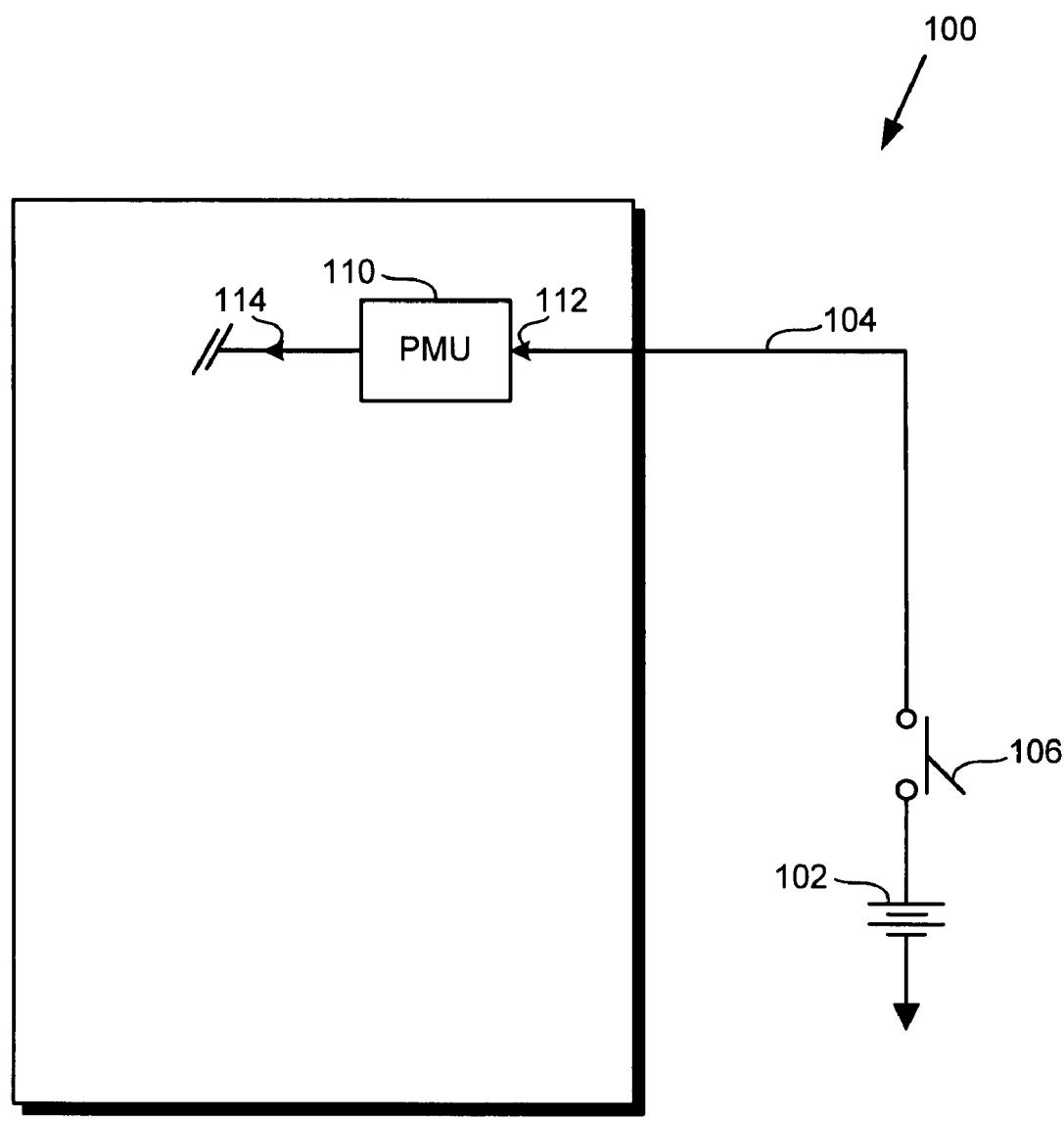
FIG. 1 is a block diagram of a conventional implementation for providing power to an electronic system.

FIG. 1 is a block diagram of a conventional implementation for providing power to an electronic system. FIG. 1 shows system 100 in combination with a power source such as battery 102. Power from battery 102 may be provided to system 100 through line 104 and switch 106. Switch 106 may be engaged or disengaged to, respectively, couple or decouple system 100 from battery 102. Also shown in FIG. 1 are power management unit (PMU) 110, PMU input 112, and PMU output 114. Additional system elements internal to system 100 receiving PMU output 114 are not shown in FIG. 1 for purposes of clarity and brevity. System 100 may be implemented on a single semiconductor die and be utilized in a portable radio frequency (RF) communication device, for example.

In a conventional approach to providing power to an electronic system such as that shown in FIG. 1, switch 106 may be used to control the deliver of power to system 100, thereby providing a mechanism for limiting depletion of battery 102. In one conventional implementation, for example, switch 106 may provide a user with two power options or modes, on and off, permitting the user to fully activate system 100, or fully deactivate the system by, respectively, coupling or decoupling PMU 110 from battery 102. In another conventional implementation, switch 106 may provide a user with three power modes. In that implementation, for example, system 100 could be placed into a standby mode, in addition to being fully activated in an on state, or fully deactivated in an off state.

In the second described conventional implementation providing three power modes, standby mode may correspond to partial coupling of battery 102 to system 100 by switch 106. For example, in standby mode, switch 106 may provide PMU input 112, but not enable full activation of system 100. In that implementation, when set to the intermediate standby mode, switch 106 might partially couple system 100 to battery 102, so that PMU 110 might receive PMU input 112, but would not deliver PMU output 114 to fully power up system 100. As a result, standby mode could be used to place system 100 in an operative condition, for example, make it responsive to RF communication signals, while not fully activating system functionality and thereby conserving battery 102.

As shown in FIG. 1, power switch 106 may be used to control delivery of power to system 100, and, as a result, be used to limit depletion of battery 102 through leakage resulting from unnecessary coupling of unneeded circuits within system 100. Whether or not the conventional implementation provides an effective approach to limiting power leakage in a battery operated system, the function of switch 106 in such a system is dedicated exclusively to providing power. In other words, in FIG. 1, switch 106 is a power switch used solely to power system 100 on and off. As explained previously, however, system 100 may be implemented in a user device having a very small device architecture, so that space available for user control inputs may be at a premium. As a result, the conventional implementation shown in FIG. 1, while providing options for reducing leakage current and conserving battery life, disadvantageously dedicates switch 106 to a single power on function.

Figure 2:
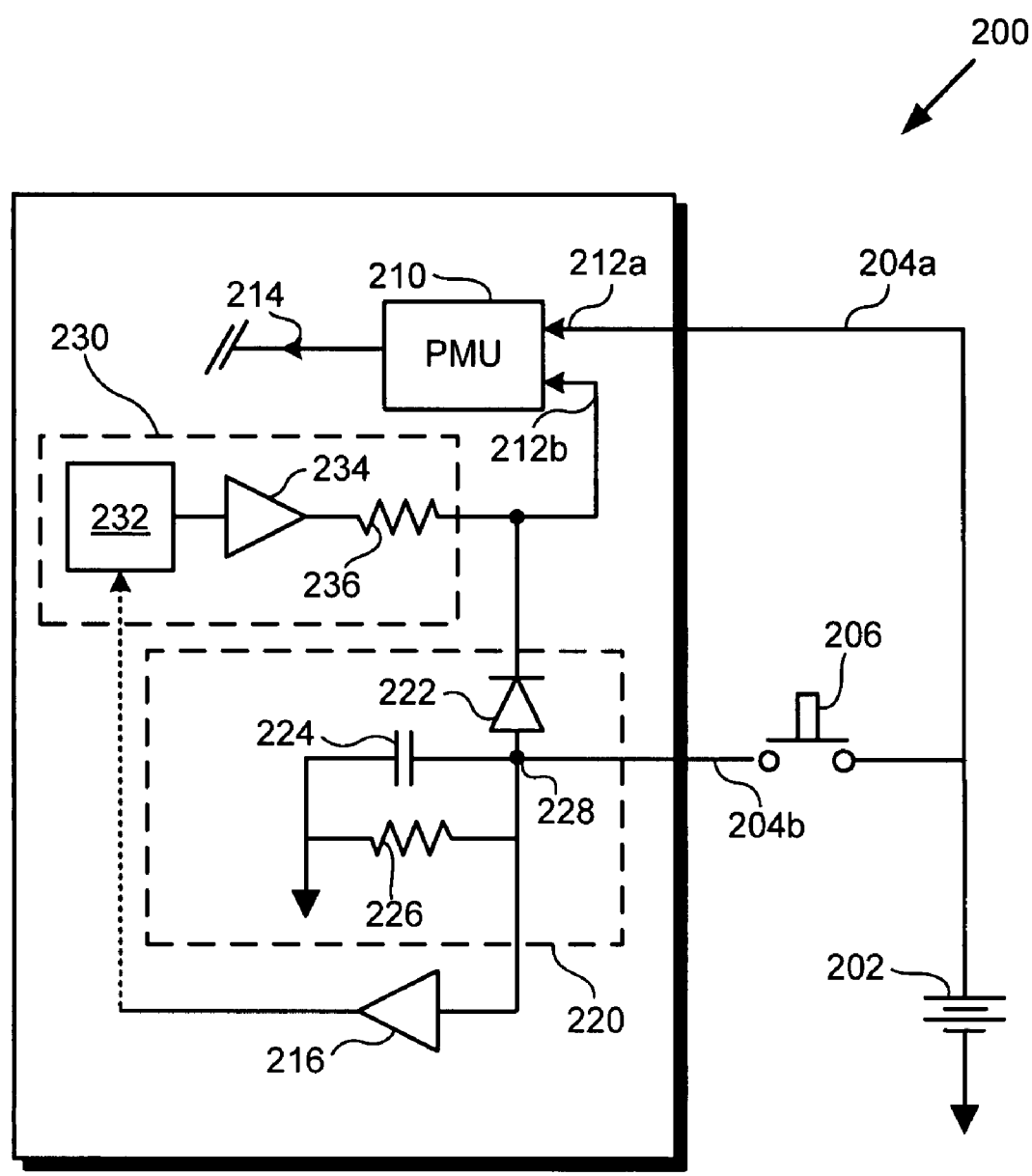
FIG. 2 is a block diagram of a multi-purpose switch activated system, according to one embodiment of the present invention.

FIG. 2 is a block diagram of a multi-purpose switch activated system, according to one embodiment of the present invention, capable of overcoming the drawbacks associated with the conventional implementation described previously in relation to FIG. 1. FIG. 2 shows diagram 200, which displays system 200 in combination with battery 202 corresponding to battery 102 in FIG. 1. Also shown in FIG. 2 are power management unit (PMU) 210, PMU output 214, and PMU inputs 212*a* and 212*b*. As in FIG. 1, additional system elements powered by PMU output 214 and not shown in the present drawings for purposes of clarity and brevity.

In the embodiment of FIG. 2, multi-purpose switch 206 is shown as a push button switch. In other embodiments, however, multi-purpose switch 206 may be a slide switch, or toggle switch, for example. As shown in FIG. 2, system 200 also comprises input buffer 216, temporary power control circuit 220, and continuous power control circuit 230. According to the present embodiment, temporary power control circuit 220 includes diode 222, capacitor 224, and drawdown resistor 226, coupled to node 228. Moreover, in the present embodiment, continuous power control circuit 230 includes power on register 232, output buffer 234 and resistor 236.

System 200 may be implemented on a single semiconductor die, and may be used in a communication system in, for example, a wireless communications device, a mobile telephone, a Bluetooth enabled device, a computer, a personal digital assistant (PDA), a digital media player, a gaming console, or in any other kind of system, device, component, or module responsive to user input controls utilized in modern electronics applications. In one embodiment, system 200 may be, or may reside in, a processor chip, for example.

System 200 includes multi-purpose switch 206 for providing a power on function and other functions to a user. In a first activation of multi-purpose switch 206, temporary power control circuit 220 can be coupled to battery 202 by multi-purpose switch 206, to provide temporary power to PMU 210, allowing power up of system 200. Subsequently, continuous power control circuit 230 can be triggered to provide continuous power to PMU 210, supporting continued operation of system 200. Multi-purpose switch 206 is capable of then providing other functions to a user of system 200, once continuous power to PMU 210 is established.

Engagement of multi-purpose switch 206 in a first activation may correspond to a user action depressing a push button switch. That action causes current to flow along line 204*b* through multi-purpose switch 206, from battery 202 to node 228. Although in the present embodiment, the power source for system 200 is battery 202, in other embodiments various suitable power sources, not limited to a battery, might be employed. Current flowing into node 228 causes a voltage to accumulate across capacitor 224. Continued engagement of multi-purpose switch 206, for example as a result of continuous depression of a push button switch by a user of system 200, leads to a continued increase of voltage across capacitor 224. When, due to the voltage on capacitor 224, an appropriate diode threshold voltage is achieved at node 228, diode 222 will be forward biased and will provide a power on signal in the form of temporary power at PMU input 212*b*. The present embodiment shows node 222 coupled to a single capacitor. In other embodiments, however, capacitor 224 can be replaced by a network of capacitors comprising more than one capacitor.

In response to the temporary power received from diode 222 at PMU input 212*b*, PMU 210 enables power up of system 200 by drawing power from battery 202 through line 204*a*. Operational power is received by PMU 210 as PMU input 212*a*, whereupon PMU output 214 is provided to the remainder of system 200. Accumulated voltage present at node 222 is further reflected by the output of input buffer 216. In effect, input buffer 216 provides an on signal as an output when multi-purpose switch 206 is engaged, and an off signal as an output when multi-purpose switch 206 is disengaged. According to the present embodiment, system 200 is configured such that a first activation of multi-purpose switch 206 in a power on function results in the on signal output of input buffer 216 being entered in power on register 232 of continuous power control circuit 230. In other embodiments, a first activation of multi-purpose switch may be stored by other means. For example, system 200 may include firmware that reads a random access memory (RAM) record formed in response to a first on signal provided as an output by input buffer 216.

In the embodiment of FIG. 2, an entry in power on register 232 corresponding to a first on signal provided by input buffer 216, triggers output buffer 234 to provide a power on signal as continuous power through resistor 236, at PMU input 212*b*. Triggering of output buffer 234 and the resultant provision of continuous power to PMU 210 may be indicated to a user of system 200 by means of a visual or audio signal, such as an illuminated light or audible beep, for example, whereupon multi-purpose switch 206 may be disengaged in a first deactivation. The described first deactivation of multi-purpose switch 206 results in temporary power control circuit 220 being decoupled from battery 202.

Despite decoupling of temporary power control circuit 220 from battery 202, PMU 210 continues to be enabled due to input at PMU input 212*b* of a power on signal as continuous power provided by continuous power control circuit 230. Decoupling of temporary power control circuit 220 from battery 202 results in termination of current flow into node 228 from battery 202. Voltage accumulated at node 222 due to capacitor 224 is dissipated through drawdown resistor 226, resulting in an off signal being provided as an output of input buffer 216. It is noted that although in the present embodiment drawdown resistance is provided by drawdown resistor 226, in another embodiment, drawdown resistance may be provided by a resistive network comprising more than one drawdown resistor.

As a result of voltage drawdown through drawdown resistor 226, node 228 goes from a voltage high, associated with the charging of capacitor 224, to a voltage low, associated with discharge of capacitor 224. The voltage at node 228 is further reflected by the output of input buffer 216, which provides an off signal. Consequently, the output of input buffer 216 becomes an indicator of the present activation state of multi-purpose switch 206, that is, activation of multi-purpose switch 206 results in accumulation of voltage at node 228 due to capacitor 224, and an on signal as the output of input buffer 216, while deactivation of multi-purpose switch 206 results in a voltage drop at node 228 due to drawdown resistor 226, and on off signal as the output of input buffer 216.

Because continuous power is being provided to PMU 210 by continuous power control circuit 230, subsequent activations of multi-purpose switch 206 can be used to provide functions other than power on. For example, in a handheld communication device, multi-purpose switch 206 could be utilized in a first activation to power the device on, in a second activation to adjust volume, in a third activation to scroll to a desired display screen in conjunction with highlighted commands appearing on a user interface (not shown in FIG. 2).

Figure 3:
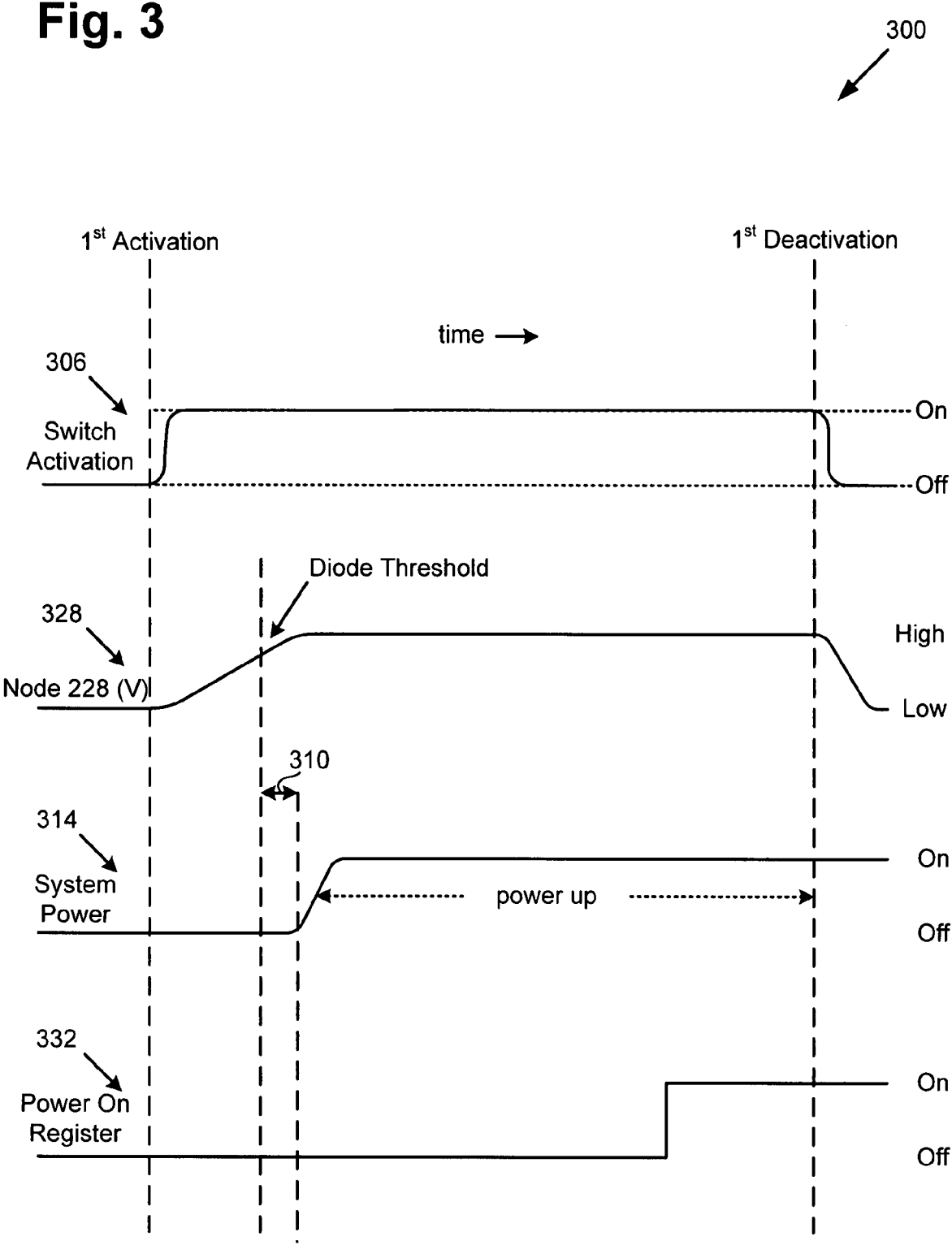
FIG. 3 shows exemplary control signals used by the multi-purpose switch activated system of FIG. 2 in the time domain, according to one embodiment of the present invention.

Turning now to FIG. 3, FIG. 3 shows exemplary control signals used by system 200 in FIG. 2, in the time domain, according to one embodiment of the present invention. Graph 300, in FIG. 3 includes trace 306 corresponding to the present activation state of multi-purpose switch 206, in FIG. 2, which is similarly reflected by the output of input buffer 216. Also shown on graph 300 is trace 328, corresponding to the voltage appearing at node 228, in FIG. 2. Trace 314 on graph 300 corresponds to power delivered to system 200, in FIG. 2, as PMU output 214, while trace 332 on graph 300 corresponds to the entry held by power on register 232, serving as the trigger for continuous power control circuit 230, in FIG. 2. It is noted that graph 300 is provided as a conceptual aid, and is not intended to precisely reflect the behavior of the elements of system 200. In particular, as is well known, the time rate-of-change of voltage accumulated on a capacitor during charging is a nonlinear phenomenon, and trace 328 on graph 300 is not intended to suggest otherwise with respect to the embodiment of FIG. 2.

Trace 306, on graph 300, shows that multi-purpose switch 206 is in initially not activated. For the example of a push button switch, $1^{st}$ Activation corresponds to depressing the push button switch to perform a power on function. Trace 306 shows that the exemplary push button switch would remain continuously depressed for a period of time, for example approximately one second, and then be released in response to a user feedback signal indicating power up of system 200. This is further shown by traces 328, 314, and 332.

Trace 328 shows the voltage state of node 228, in FIG. 2. As shown by graph 300 and system 200, the initial voltage at node 228 is low due to the effect of drawdown resistor 226, which is coupled to ground. Beginning with a $1^{st}$ Activation, coinciding with depression of the push button switch by a user, the voltage at node 228 increases due to voltage accumulation by capacitor 224. When the voltage at node 228 reaches a threshold voltage for diode 222, which may be, for example, approximately 0.7 V, diode 222 is forward biased by capacitor 224. Continuous depression of the push button switch causes the voltage at node 228 to remain high. At a $1^{st}$ Deactivation, or release of the push button switch by a user, the voltage at node 228 drops to a low value due to the action of drawdown resistor 226 in the absence of coupling to battery 202, returning to a low value after a time interval lasting from approximately several microseconds to a few milliseconds, for example.

As shown by trace 314, after a brief delay, perhaps also lasting from approximately several microseconds to a few milliseconds, for example, and shown by interval 310, PMU 210, in FIG. 2, provides PMU output 214, and powers up system 200. As explained in conjunction with FIG. 2, according to the present embodiment, power up of system 200 includes making an entry in power on register 232 corresponding to the output of input buffer 216. Input buffer 216 reflects the present activation state of the push button switch, so that during the power up interval, initiated by temporary power provided by temporary power control circuit 220, the output of input buffer 216 will provide an on signal. Entry of the on signal into power on register 232 during the power up interval results in triggering of output buffer 234, resulting in delivery of continuous power by continuous power control circuit 230.

Transition from provision of temporary power to provision of continuous power is further shown in graph 300 by the region to the right of the $1^{st}$ Deactivation. In that region, the push button switch has been released by the user, resulting in decoupling of temporary power control circuit 220 from battery 202, and subsequent drawdown of the voltage accumulated at node 228. Despite absence of temporary power provided to PMU 210, however, PMU output 214 and system power remain on, as a result of continuous power provided by continuous power control circuit 230, activated by the presence of a power on entry in power on register 232.

Figure 4:
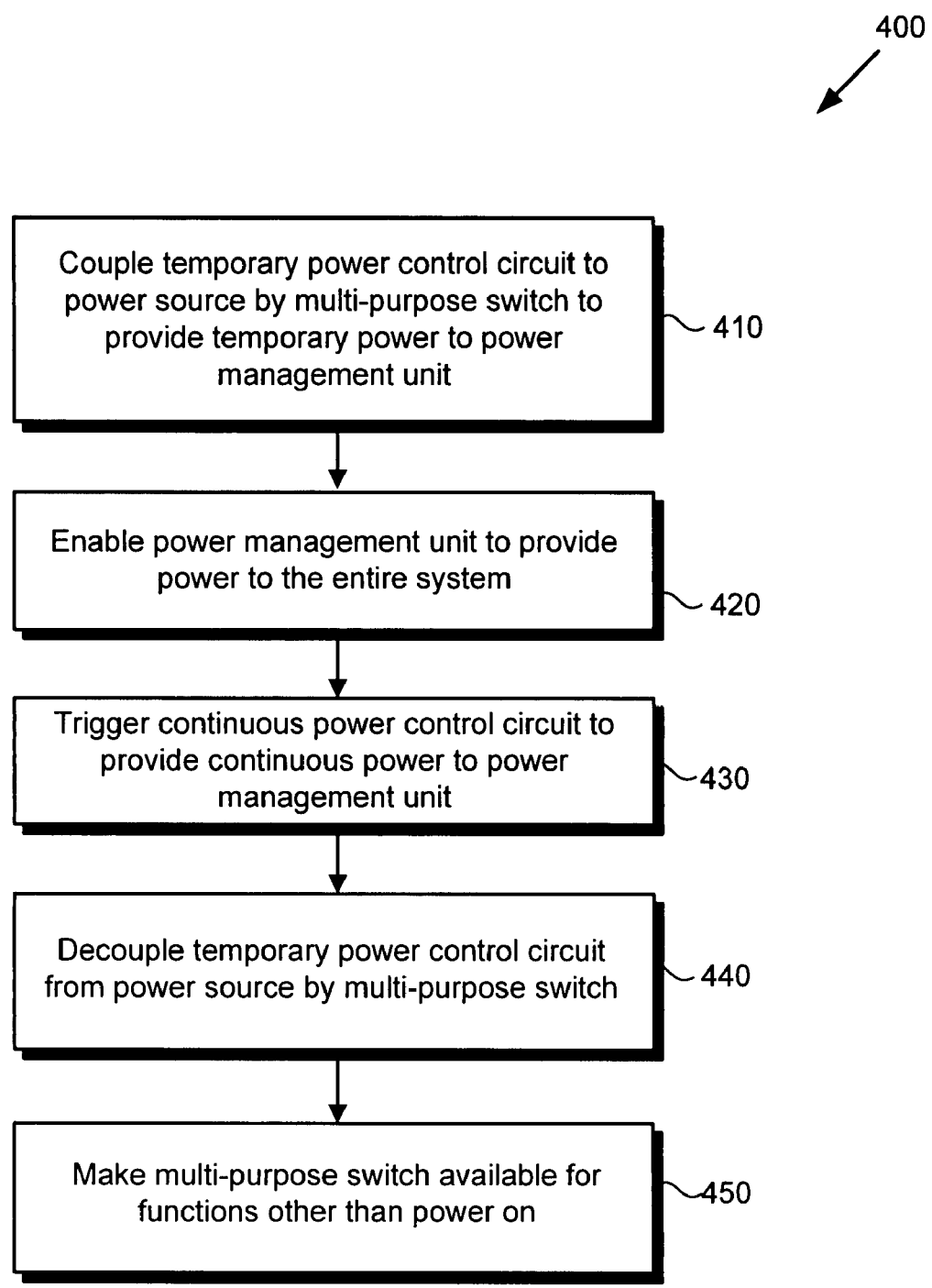
FIG. 4 is a flowchart of a method for utilizing a multi-purpose switch activated system, according to one embodiment of the present invention.

The operation of system 200 in FIG. 2 is further explained in combination with FIG. 4, which shows flowchart 400 describing the steps, according to one embodiment of the present invention, for utilizing a multi-purpose switch activated system. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400, in conjunction with FIG. 2 and FIG. 3, step 410 comprises coupling temporary power control circuit 220 to battery 202 by a first activation of multi-purpose switch 206. Coupling temporary power control circuit 220 to battery 202 provides temporary power to PMU 210 of system 200, as described in relation to FIG. 2. As earlier noted, in another embodiment, battery 202 can correspond to any suitable power source for an electronic system. Moreover, multi-purpose switch 206 may comprise a push button switch, as shown in FIG. 2, but may also comprise other switch mechanisms, such as a slide switch, or toggle switch, for example. As was previously described, coupling of temporary power control circuit 220 to battery 202 provides a power on signal as temporary power to PMU 210. As a result, in step 420 of flowchart 400, PMU 210 is enabled and provides PMU output 214 to power entire system 200.

Continuing with step 430 of flowchart 400, step 430 comprises triggering continuous power control circuit 230 to provide continuous power to PMU 210. As explained during the description of FIG. 2, continuous power control circuit 230 can be triggered in response to making an entry in power on register 232 corresponding to the on signal provided by input buffer 216. In another embodiment, information corresponding to the on signal provided by input buffer 216 may be written to a memory cell by a firmware controlling power up of system 200, for example, and that memory cell may be accessed to trigger continuous power control circuit 230.

Proceeding with step 440 of flowchart 400, step 440 comprises decoupling temporary power control circuit 220 from batter 202 by a first deactivation of multi-purpose switch 206. As discussed, triggering of continuous power control circuit 230, in step 430, makes it possible to terminate provision of temporary power from temporary power control circuit 220, without effecting the power on state of system 200. In effect, continuous power control circuit 230 replaces temporary power control circuit 220 as the source of a power on signal to PMU 210. As a result, PMU input 212 is supplied by elements internal to system 200, rather than being drawn from battery 202. Consequently, decoupling of temporary power control circuit 220 from battery 202 reduces leakage from battery 202, thereby conserving battery power.

In step 450 of flowchart 400, multi-purpose switch 206 may be made available to a user of system 200 for functions other than power on, as described in conjunction with FIG. 2. It is noted that one of the other functions made available to a user of system 200 may be a power off function. Thus, in one embodiment, multi-purpose switch 206 may be used initially for power on, subsequently for functions such as scrolling, or volume control, for example, before being used to power off system 200. Those additional functions can be executed by subsequent respective activations of multi-purpose switch 206, following the first activation as a power on function. In one embodiment, a user need not affirmatively power off system 200. In that embodiment, system 200 is further configured to shut down continuous power control circuit 230 after a predetermined time period of nonuse of system 200.

By utilizing a multi-purpose switch to couple a temporary power control circuit to a power source in order to deliver temporary power to an electronic system while also causing a continuous power control circuit to be triggered, the present disclosure describes a novel implementation for activating the system. By subsequently decoupling the temporary power control circuit from the power source, the present disclosure enables the twofold advantages of reduced power leakage and availability of a multi-purpose switch for other functions in addition to powering on the system. As a result, the present application discloses embodiments which prolong battery life when external power is supplied by a battery source. Moreover, the present application reveals a system and method which further improve the efficiency of an electronic system by providing enhanced functionality of a user input control in the form of a multi-purpose switch.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, a multi-purpose switch activated system and method for using same have been described.

The invention claimed is:

1. A system with a multi-purpose switch for providing a power on function and other functions to a user, said system comprising:
a temporary power control circuit being configured to be coupled to and decoupled from a power source by said multi-purpose switch to provide temporary power to a power management unit;
a continuous power control circuit to provide continuous power to said power management unit;
said multi-purpose switch being capable of providing said other functions when said continuous power is provided to said power management unit;
wherein said system is implemented using a single semiconductor die.

2. The system of claim 1, wherein said power source comprises a battery.

3. The system of claim 1, wherein said multi-purpose switch comprises a push button switch.

4. The system of claim 1, wherein said temporary power control circuit comprises a diode delivering said temporary power to said power management unit, said diode being coupled to and forward biased by one or more capacitors.

5. The system of claim 4, wherein said temporary power control circuit further comprises one or more drawdown resistors.

6. The system of claim 1 further comprising an input buffer coupled to said multi-purpose switch, said input buffer being configured to provide an on signal when said multi-purpose switch is engaged and an off signal when said multi-purpose switch is disengaged.

7. The system of claim 1, wherein said continuous power control circuit comprises a power on register coupled to an output buffer providing said continuous power to said power management unit.

8. The system of claim 7, wherein said output buffer is triggered by an entry in said power on register corresponding to a first on signal.

9. The system of claim 1, wherein said continuous power control circuit ceases providing said continuous power to said power management unit after a predetermined time period of system nonuse.

10. The system of claim 1 utilized as a part of a communication system, said communication system being selected from the group consisting of a wireless communications device, a mobile telephone, a Bluetooth enabled device, a computer, a personal digital assistant (PDA), a digital media player, and a gaming console.

11. A method for utilizing a multi-purpose switch in an electronic system to provide a power on function and one or more other functions to a user of said electronic system, said method comprising:
implementing a temporary power control circuit, a continuous power control circuit, and said multi-purpose switch, using a single semiconductor die;
coupling said temporary power control circuit to a power source by a first activation of said multi-purpose switch to provide temporary power to a power management unit of said electronic system;
triggering said continuous power control circuit to provide continuous power to said power management unit;
decoupling said temporary power control circuit from said power source by a first deactivation of said multipurpose switch;
making said multi-purpose switch available to provide said one or more other functions to said user.

12. The method of claim 11, further comprising enabling said power management unit to provide power to said electronic system.

13. The method of claim 11, further comprising executing said one or more other functions in response to subsequent activations of mid multi-purpose switch.

14. The method of claim 11, further comprising shutting down said continuous power control circuit after a predetermined time period of nonuse of said electronic system.

15. The method of claim 11, wherein mid first activation of said multi-purpose switch comprises engaging a push button switch.

16. The method of claim 11, wherein mid electronic system comprises a battery operated electronic system.

17. The method of claim 11, wherein mid temporary power control circuit comprises a diode delivering mid temporary power to said power management unit, said diode being coupled to and forward biased by one or more capacitors.

18. The method of claim 17, wherein said temporary power circuit further comprises one or more drawdown resistors.

19. The method of claim 11, wherein said continuous power control circuit comprises a power on register coupled to an output buffer providing said continuous power to said power management unit.

20. The method of claim 19, wherein said output buffer is triggered by an entry in said power on register corresponding to said first activation of said multi-purpose switch.

* * * * *